June 10, 1930.  R. LITTLER, SR  1,762,926
SAFETY DEVICE FOR AUTOMOBILE STARTERS
Original Filed March 7, 1927
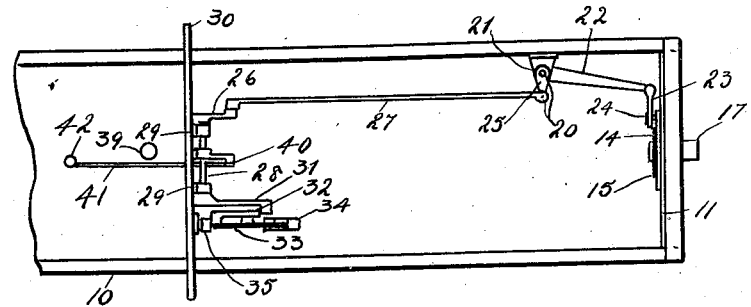
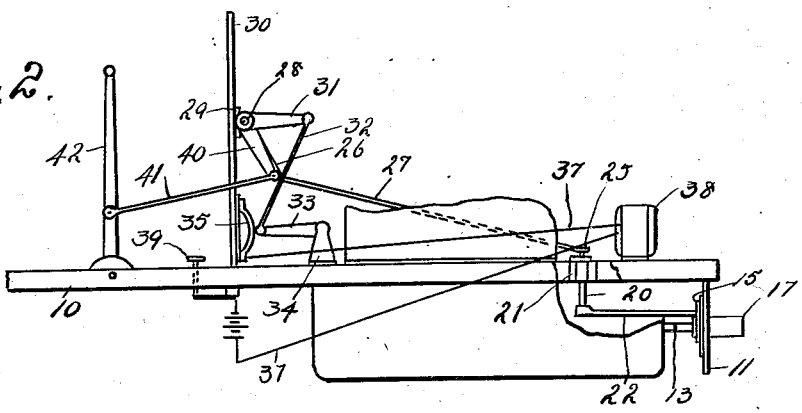
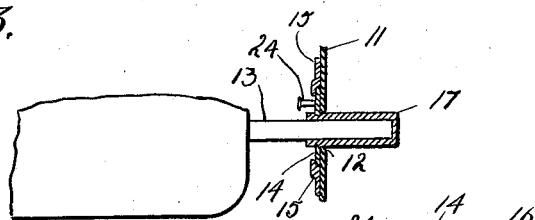
Inventor
Robert Littler Sr.

Patented June 10, 1930

1,762,926

UNITED STATES PATENT OFFICE

ROBERT LITTLER, SR., OF PHILADELPHIA, PENNSYLVANIA, ASSIGNOR TO MARTHA E. LITTLER, OF PHILADELPHIA, PENNSYLVANIA

SAFETY DEVICE FOR AUTOMOBILE STARTERS

Original application filed March 7, 1927, Serial No. 173,405. Divided and this application filed October 27, 1927. Serial No. 229,152.

My present invention relates to new and useful improvements in devices for automobile starters, being a division of my former application for patent, Serial No. 173,405, dated March 7, 1927, and has for its object to provide an exceedingly simple and effective device which will eliminate the possibility of starting the engine of an automobile either by cranking or by the usual electric starter unless the shifting mechanism is in neutral, by the use of a member removable from the cranking shaft.

With these ends in view, this invention consists in the details of construction and combination of elements hereinafter set forth and then specifically designated by the claims.

In order that those skilled in the art to which this invention appertains may understand how to make and use the same, I will describe its construction in detail, referring by numerals to the accompanying drawings forming a part of this application, in which:

Fig. 1, is a plan view of a portion of an automobile chassis showing my present improved safety device applied thereto.

Fig. 2, is a side elevation of Fig. 1.

Fig. 3, is an enlarged sectional view of the slide plate and shield, the engine shaft being in elevation.

Fig. 4, is a detail view of the shield.

Fig. 5, is a detail view of the slide plate.

Fig. 6, is a section approximately on the line 6—6 of Fig. 1 with the mechanism for operating the safety slide plate entirely removed.

In carrying out my invention as herein embodied, 10 represents a portion of an automobile carrying the apron 11 in the front thereof, which apron has the usual hole or opening 12 for the passage of the engine shaft 13.

14 represents the safety slide plate which is mounted in the guideways 15 so as to slide back and forth crosswise of the hole 12, and in this slide plate is formed the button hole slot 16; the two end portions of said slot being of less width than the central portion thereof for the purpose hereinafter explained.

17 represents a shield which is intended to fit over the projecting end of the shaft 13 and through the slot 16 in the safety slide plate, and this shield has an annular groove 18, in which the edges of the narrow portions of the slot 16 slide.

When these edges are in this groove, the shield cannot be withdrawn from the shaft, and therefore the engine cannot be cranked, and this condition is maintained at all times when the gear shifting lever of the automobile is not in neutral, as hereinafter explained; but when the gear shifting lever is in neutral the enlarged portion of the slot 16 coincides with the axis of the shield 17, and thus permits the shield to be withdrawn for the application of the crank.

20 represents a short shaft journalled in the bearing 21, the latter being mounted on the frame of the machine and the lower end of this short shaft carries the arm 22 which is connected by the link 23 with the safety slide plate 14, by the stud 24.

The upper end of the short shaft 20 carries the short lever 25 and this short lever is connected with the lever 26 by the connecting rod 27; the lever 26 being secured to one end of the horizontal shaft 28, the latter being mounted in suitable bearings 29 secured to the instrument board 30 or some other convenient portion of the machine. Upon the opposite end of this horizontal shaft 28 is secured a lever 31 to which is pivoted the connecting rod 32, the lower end of said rod being pivoted to the electric actuating switch bar 33 which latter is pivoted to the bracket 34 mounted upon the machine.

35 represents the movable member of an electric switch or circuit closer so mounted that when the bar 33 is in the position shown in Fig. 2, the circuit 37, which includes the starting motor 38, will be closed with the exception of the foot switch 39, so that the actuation of this switch 39 will permit the motor 38 to be put into operation in the usual manner; but when the connecting bar 33 is drawn out of contact with the movable member 35, this circuit will be opened, and therefore, the motor cannot be started even though the foot switch 39 is closed.

40 represents an arm secured to the horizontal shaft 28, and this arm is connected by a rod 41 to the ordinary gear shifting lever 42, from which it will be seen that when this lever is in the position representing neutral, here shown as being vertical, the starting motor may be put in operation or a crank may be applied to the projecting portion of the engine shaft 13, for starting the engine manually, but when the lever 42 is moved either forward or backward, the mechanism previously described will open the circuit through the movable member 35 and will shift the slide plate 14 to one side or the other, thus carrying the enlarged portion of the slot 16 out of alignment with the shield thereby preventing the running of the starting motor or the application of a crank for starting the engine.

From the foregoing description, it will be obvious that the engine of an automobile equipped with my present improved safety device cannot be started when the transmission is in gear, thus entirely avoiding the many and serious accidents and loss of life incident to the present construction of said machines.

The gist of my invention rests in the broad idea of preventing the manual cranking or power starting of the engine of a motor vehicle when the transmission is set for transmitting power from the engine to the driving wheels of the vehicle, and I, therefore, do not limit myself to the details of construction here shown as these may be varied within the scope of the appended claims without departing from the spirit of my invention.

Having thus fully described my invention, what I claim as new and useful is:

1. A safety device for automobiles, comprising a shield adapted to be applied to and removed from the cranking end of the engine shaft of the automobile, and means for locking said shield against withdrawal while the transmission mechanism of the automobile is out of neutral.

2. In combination with the engine shaft of a motor vehicle, a shield adapted to be placed upon said shaft or removed therefrom and when in place preventing application of a starting crank to the shaft; a plate having a slot therein, through which said shield is adapted to pass, and means for locking the shield upon the shaft when the plate is in other than neutral position.

3. In a device of the character described, a slide mounted upon that portion of an automobile through which the cranking end of the engine shaft projects; means for operating the slide from the transmission lever; and a circuit breaker included in the circuit of the electric starter, a shield adapted to be placed upon said shaft or removed therefrom and when in place preventing application of a starting crank to the shaft, said shield having a groove therein, said slide having a button hole slot therein, the edges of the narrow portions of said slot being adapted to engage the groove in said shield for preventing the removal of the latter.

4. In a device of the kind described, an engine, power transmission mechanism, devices controlling the latter, a cranking shaft adapted to receive a starting crank, a shield removably mounted on the shaft and when in place acting as a barrier to the application of the crank, means coacting with the shield to hold said shield on the shaft and prevent its removal, and means connected with said shield holding means and the devices controlling the power transmission mechanism to move said holding means and release the shield when said power transmission mechanism is in a neutral position.

5. The structure set forth in claim 4 in combination with a starting motor, an electric circuit including said motor, a source of electrical energy and a switch, and means connecting the devices controlling the power transmission mechanism and said switch whereby the latter will be actuated simultaneously with the movements of the shield holding means to close the switch when the said holding means coacts with the shield to prevent displacement of the latter.

6. In a device of the kind described, an engine power transmission mechanism, devices controlling the latter, a crank shaft adapted to receive a starting crank, means removably mounted on the shaft to act as a barrier to the application of the crank, and means coacting with said first mentioned means to normally hold said first mentioned means on the shaft and prevent its removal, and means connected with the second mentioned means and the devices controlling the power transmission mechanism to move said second mentioned means and release the first mentioned means when said power transmission mechanism is in a neutral position.

In testimony whereof, I have hereunto affixed my signature.

ROBERT LITTLER, Sr.